TELEVISION DEFLECTION SYSTEM CIRCUITRY

Filed Nov. 18, 1954 2 Sheets-Sheet 1

INVENTORS
VERNON D. LANDON &
ARTHUR W. VANCE

BY [signature]
ATTORNEY

INVENTORS
VERNON D. LANDON &
ARTHUR W. VANCE
BY [signature]
ATTORNEY 2,817,788

TELEVISION DEFLECTION SYSTEM CIRCUITRY

Vernon David Landon, Princeton, and Arthur William Vance, Cranbury, N. J., assignors to Radio Corporation of America, a corporation of Delaware Application November 18, 1954, Serial No. 469,682

20 Claims. (Cl. 315—27)

The invention relates to the electric circuit portions of electron beam deflection systems for cathode ray discharge devices or kinescopes having either flat faces or faces of relatively large radii of curvature. It particularly pertains to such circuitry for obtaining uniform linearity of the rasters on such devices as observed from a distance.

The usefulness of cathode ray discharge devices in scientific investigations and in image transmission systems is largely dependent on linear sweep of the cathode ray or electron beams from the view point of the observer. For example, in present day television practice, an image is formed on the face of a kinescope by an electron beam which is deflected to trace successive lines forming a raster on the fluorescent screen arranged on the internal surface of the face of the kinescope. The electron beam may be deflected by an electrostatic deflection system or by a magnetic deflection system. Deflection of the electron beam is accomplished magnetically by applying a sawtooth wave of current to the deflection system windings which are mounted in a mechanical yoke arranged about the neck of the kinescope. The electron beam traverses a line of the raster as the current flow in a deflection system winding increases and is more rapidly returned to the beginning of the next line when the trailing edge of the sawtooth wave abruptly reverses the flow of current. If the deflection current increases at a linear rate, the electron beam will be deflected at a substantially uniform angular rate. However, it is more desirable that the electron beam trace across the fluorescent screen at a rate which appears linear to the eye of the observer located some distance away and to all practical purposes substantially on the central axis of the kinescope. With flat face kinescopes, therefore, it is desirable that the electron beam traverse the fluorescent screen at a uniform linear rate; and because of the geometry of the kinescope, a linear angular deflection of the beam will not correspond to a linear trace of the beam on the fluorescent screen. If the angular deflection of the beam is uniform, the beam will move at a greater velocity near the extremities of the raster. For those kinescopes of the type having a spherical face of radius of curvature greater than the distance between the curved face of the kinescope and the center of deflection, the beam will still move at greater velocity near the extremities of the raster for uniform angular deflection of the beam. Although the distortion may not appear nearly so pronounced to the observer, correction is still required.

It has been suggested that a uniform traverse of the raster be made by introducing a compensating waveform into the deflection wave to be applied to the deflection system windings, and several circuit arrangements for so doing have been put into commercial use. The circuit arrangements according to the invention while operating on a different principle, afford additional means for obtaining the desired compensation and at the same time offer the distinct and important advantage of simplicity of design and construction, both of which inherently bring in advantages of economic import.

An object of the invention is to provide improved means for linearizing the traverse of the electron beam upon the fluorescent screen of a cathode ray tube or kinescope.

Another object of the invention is to provide an improved circuit arrangement for deflecting the electron beam of a cathode ray tube or kinescope at non-uniform angular rate in response to the application of a substantially linear sawtooth current wave.

The objects of the invention are attained in an electron beam deflecting circuit arrangement for cathode ray tubes or kinescopes having a deflection system winding connected to the output circuit of a deflection wave translating device or other source of substantially linear sawtooth current waves in which there is interposed in series circuit relationship with the winding a capacitive reactance element, or a capacitor, of critical value in imparting a parabolic curve into the waveform to compensate for the varying distance between the center of electron beam deflection and the internal surface of the face of the cathode ray tube or kinescope.

According to the invention the capacitive reactance element, or series capacitor, has a capacity equal to the time interval between the end of one voltage pulse to the beginning of the next divided by one-eighth of the product of the inductance of the winding and the square of the sine of the maximum deflection angle all multiplied by a fraction equal to the ratio of the actual radius of the cathode ray tube or kinescope under consideration divided by the difference between that radius and the radius of a theoretical sphere defined by the intersection of points of uniform angular variation of deflection angle with uniform linear deflection of the luminous spot on the face of the cathode ray tube or kinescope as received by the eye of the observer. For flat faced tubes or kinescopes the latter factor reduces to unity. For kinescopes of the type wherein the radius of curvature of the face is equal to twice the distance from the center of deflection to the center of the face, as commonly manufactured, the factor reduces by four or the capacity required is one-half of the quotient of the square of the time interval and the product of the value of inductance and the square of the maximum deflection angle.

The conventional deflection circuitry requires that the voltage pulse width be held between 0.05 and 0.15 of the total pulse period; the time interval between pulses being, on the average, of the order of nine-tenths of the total pulse period. The value of the time interval can thus be expressed as the product of a constant and the total pulse period or the quotient of that constant and the pulse recurrence frequency. The latter expression may be more convenient for practical design purposes.

In order that the practical aspects of the invention may be more fully appreciated, an express embodiment of the invention, given by way of example only, is described with reference to the accompanying drawing in which.

Figures 1, 2:
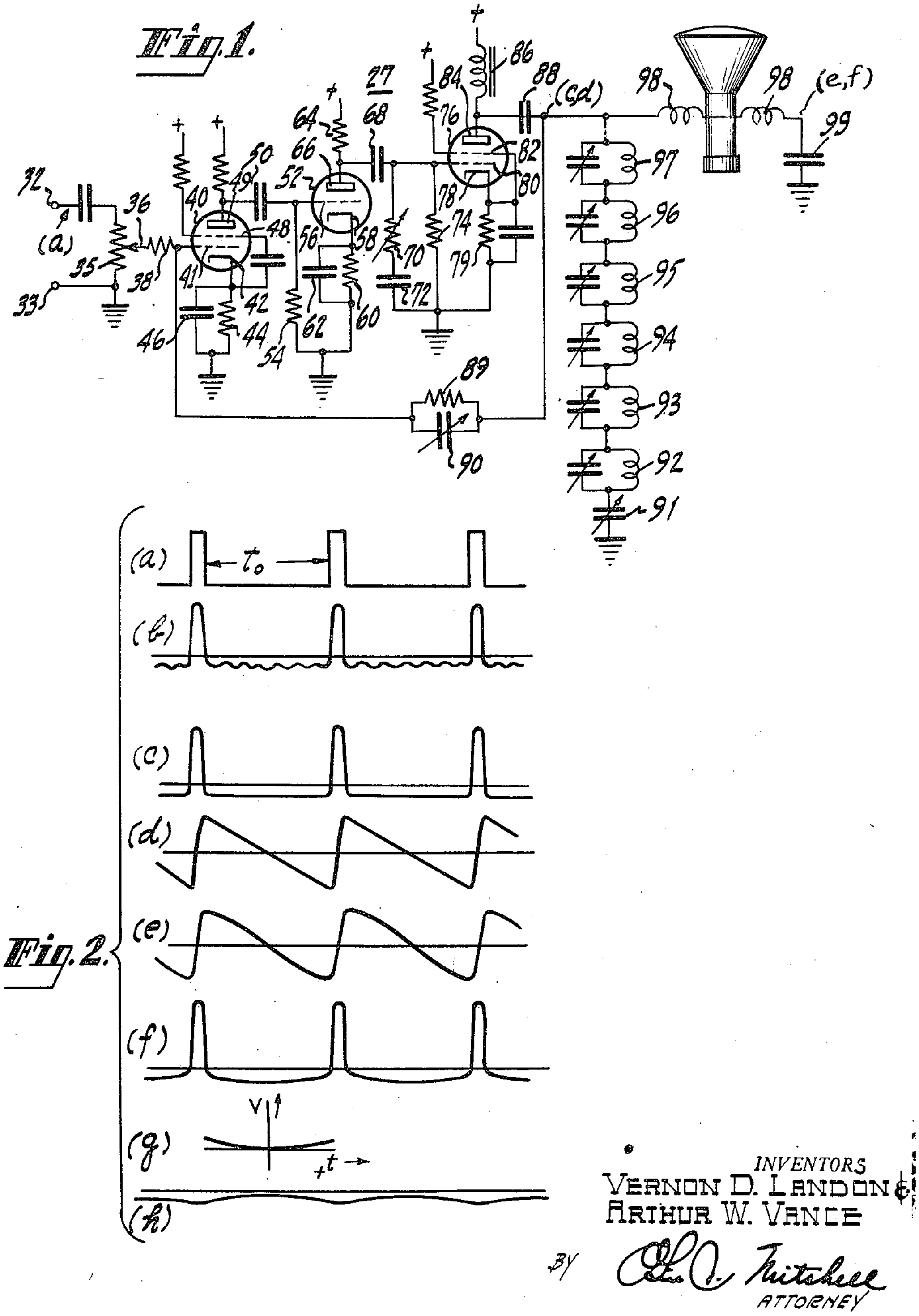
Fig. 1 is a schematic diagram of a kinescope beam deflecting circuit arrangement according to the invention.
Fig. 2 is a graphical representation of waveforms obtained at pertinent points in the circuit arrangement shown in Fig. 1.

In Fig. 1 there is shown a schematic diagram of a horizontal deflection wave generating circuit arrangement for use with an externally synchronized oscilloscope or a television receiver or the like. Such a television receiver, for example, may otherwise comprise circuits which may be entirely conventional and which will be described to illustrate the setting of the invention. In such a receiver television signals appearing at an antenna are applied to a radio frequency wave amplifying circuit and the output therefrom is applied along with a wave obtained from a local beat oscillation generating circuit through a frequency changing circuit. The output of the frequency changing circuit is applied to an intermediate frequency (I. F.) amplifier which may be an individual picture I. F. amplifying circuit or one amplifying both picture and sound I. F. signals. A demodulating circuit is coupled to the I. F. amplifying circuit for deriving a video wave from the television signals. The detected video signals are amplified in a video frequency amplifying circuit and thereafter applied to the input circuit of an image reproducing device, or kinescope. Sound signals are derived from the frequency changing circuit, or from the I. F. amplifying circuit, or from the demodulating circuit, for further processing in a sound I. F. amplifying circuit, an aural signal discriminating circuit, an audio frequency amplifying circuit and a transducer, usually in the form of a speaker. The output of the video amplifying circuit is also applied to a synchronizing pulse separating circuit to separate the synchronizing pulses from the image information and the vertical synchronizing pulses from the horizontal. The separated vertical synchronizing pulses are applied to a vertical deflection wave generating circuit and the horizontal synchronizing pulses are applied to a horizontal deflection frequency wave generating circuit 27. A high voltage generating circuit may be coupled to the horizontal deflection wave generating circuit 27, and the vertical deflection generating circuit, the horizontal deflection wave generating circuit 27, and high voltage generating circuit are coupled to the kinescope to furnish the necessary vertical and horizontal deflection wave and second anode, or ultor, potentials. A low voltage power supply usually connected to the local A.-C. power line is connected to furnish direct energizing potentials to all circuits including the horizontal deflection wave generating circuit 27 with the positive pole at the terminals marked with the plus sign and the negative pole at ground. An automatic gain control (A. G. C.) amplifying and distributing network is coupled to the synchronizing pulse separating circuit, or to the video frequency demodulating circuit, to supply control potential to the desired ones of the circuits previously mentioned. Usually the R. F. and the I. F. circuits are at least so supplied.

Now referring specifically to the schematic diagram, a horizontal synchronizing pulse train is applied to the synchronizing pulse input terminals 32, 33 and impressed by way of a coupling capacitor 34 across an input synchronizing pulse level potentiometer 35 having an adjustable arm 36. By means of a series resistor 38, synchronizing pulses of the proper level are applied to a controlled electron flow path device, shown here as an electron discharge device 40, between the control electrode or grid 41 and the common circuit electrode or cathode 42 by way of a cathode resistor 44 which is shunted by a bypass capacitor 46. The electron discharge device 40 also includes a screen grid 48 and an output electrode or anode 49. By means of a coupling capacitor 50, the anode electrode 49 is coupled to a succeeding controlled electron flow path or electron discharge amplifying device 52 across an input resistor 54 connected between the control electrode 56 and the cathode 58. The cathode 58 is connected to ground by means of a cathode resistor 60 shunted by a bypass capacitor 62. The pulse output wave developed across the anode resistor 64, connected to the anode 66 is applied by way of a coupling capacitor 68 to an input circuit comprising a variable resistor 70 and a capacitor 72 connected in a series circuit across which another resistor 74 is connected. This series-parallel circuit forms the input to a horizontal deflection wave translating or amplifying controlled electron flow path in the form of an electron discharge device 76 having a common circuit electrode or cathode 78, an electron flow controlling electrode or grid 80 connected to the input circuit and the coupling capacitor 68, a screen electrode 82 and an output electrode or anode 84. The output pulse wave appearing at the anode 84 is integrated across an inductive reactance element 86 and applied through a blocking capacitor 88 through a feedback resistor 89, shunted by a phasing capacitor 90, to the control grid 41 of the electron discharge amplifying device 40. A series circuit comprising an adjustable capacitor 91 and a plurality of parallel inductive-capacitive reactance (L-C) circuits 92–97 is connected to the output circuit of the deflection wave translating device, between the blocking capacitor 88 and a point of fixed reference potential, shown here as ground. To the blocking capacitor 88 there is also connected a series circuit comprising a deflection system winding shown as having two separate portions 98, 98, and a series capacitor 99.

The three electron discharge devices 40, 52 and 76 are connected to constitute a feedback amplifier. The synchronizing pulse train applied to the input terminals 32, 33 is shown in Fig. 2(*a*). If the feedback network comprising the resistor 89 and the capacitor 90 were disconnected the output voltage pulses between the blocking capacitor 88 and ground would be as shown in Fig. 2(*b*). The feedback eliminates the wavy base line leaving voltage pulses as shown in Fig. 2(*c*), which pulses upon integration, involving the inductor 86, form the sawtooth current wave shown in Fig. 2(*d*). The current wave shown in Fig. 2(*d*) is the first integral of the voltage wave shown in Fig. 2(*c*), since the current flowing through a pure inductance element can be expressed as the integral of the voltage across it. This is true in general, because the resistance of such a winding may be kept so small as to have a negligible effect on the current. This is the current waveform required across the deflection coil winding 98, 98 to obtain uniform angular deflection. At Fig. 2(*e*) there is shown a current waveform required to obtain linear deflection on a flat faced kinescope, which type of kinescope requires the maximum of correction. The corresponding voltage wave is shown in Fig. 2(*f*).

Upon inspection of the curve of Fig. 2(*g*), it is seen that the individual curves in the base line of the curve in Fig. 2(*f*) are parabolic. With the origin placed midway between pulses at the most negative point of the curve, it is seen that the voltage is equal to a constant multiplied by the square of the time interval. It should be noted that the inverted parabolic wave in Fig. 2(*h*) is the second integral of the voltage wave shown in Fig. 2(*c*). The current wave which appears at the output terminal of the blocking capacitor 88, shown in Fig. 2(*d*) is again integrated upon passing through the series capacitor 99. Upon subtracting the voltage shown in Fig. 2(*h*) from the voltage wave shown in Fig. 2(*c*) the voltage wave across the deflection coil shown at Fig. 2(*f*) is obtained.

The voltage wave appearing between the output terminal of the blocking capacitor 88 and ground, which wave is represented by Fig. 2(*c*), is applied across the series circuit comprising the deflection system winding 98, 98 and the large series capacitor 99. The linearity between the pulses of the wave shown in Fig. 2(*c*) may be maintained in several ways. The most commonly used circuit arrangement has a damping tube incorporated therein. Examples of such circuit arrangements are to be found in U. S. Reissue Patent 21,400 issued March 19, 1940 to A. D. Blumlein; U. S. Patents 2,382,822 issued August 14, 1945, 2,396,476 issued March 12, 1946, 2,460,601 issued February 1, 1949 to Otto H. Schade; U. S. Patent 2,449,969 issued to Anthony Wright, September 28, 1948. Another method is described and several circuit arrangements therefor are shown in U. S. Patent 2,149,077 to A. W. Vance issued February 28, 1939.

In the arrangement shown in Fig. 1, the winding, 98, 98 and the series capacitor 99 are resonated to the input pulse frequency and to each of a plurality of harmonics thereof by the series circuit arrangement comprising the adjustable capacitor 91 and the parallel circuits 92—97 which are individually tuned to resonate the overall circuit to the second through seventh harmonics respectively. The adjustable capacitor 91 is adjusted to resonate the overall circuit arrangement to the fundamental pulse recurrence or line frequency.

It should be understood of course, that while the description of the circuit arrangement has been confined to a horizontal deflection system, the principles of the invention apply equally well to a vertical deflection system and any cathode ray tube device to be operated will preferably have both the vertical and horizontal deflection circuits arranged according to the principles of the invention.

Figure 3:
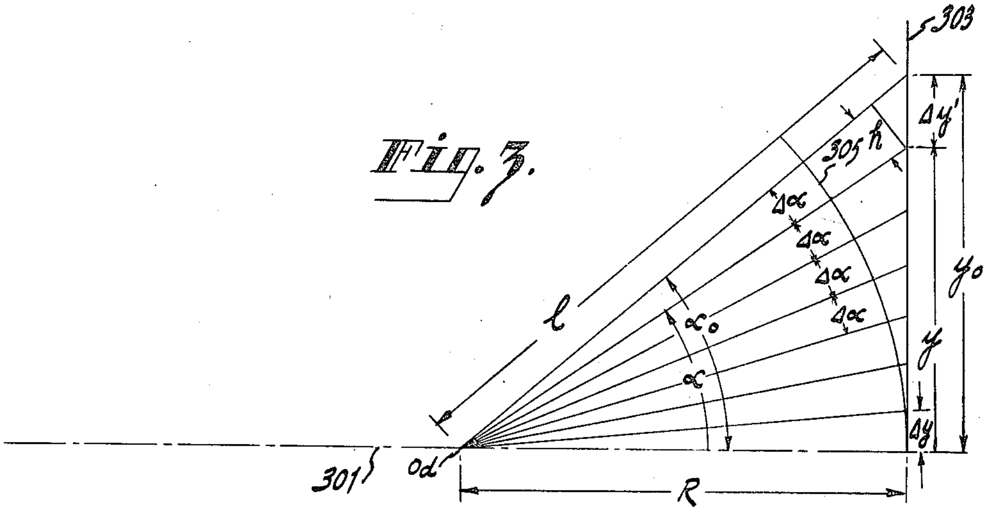
Figs. 3 and 4 are graphical representations of geometrical considerations useful in illustrating the operation and accuracy of the circuit arrangement according to the invention.

The circuit arrangement according to the invention is based on generating a waveform having parabolic components. Because it may not be readily apparent that a parabolic wave component is involved, the derivation is given below in connection with Fig. 3, which is a graphical representation of geometrical considerations necessary to an understanding of the operation of the circuit arrangement according to the invention. Referring to Fig. 3, the chain line 301 represents the central axis of the kinescope and the line 303 represents a line on the inner surface of a flat kinescope face intersecting the axis 301. The center of deflection of the electron beam is located at the point $O_d$ on the axis 301, at a distance R, referred to as the radius of deflection, from the kinescope face line 303, and the curve 305 represents a line on the surface of a sphere of radius R with center at point $O_d$ and lying in the plane defined by the lines 301, 303. From an inspection of Fig. 3 it can be seen that for equal angular increments, $\Delta\alpha$, the linear deflection $\Delta y'$ of the beam at the outer portion of the kinescope face is greater than the linear deflection, $\Delta y$, at the center. The length $l$ of the electron beam at the deflection angle $\alpha$ is $$l=\frac{R}{\cos\alpha} \quad (1)$$

Where R is the distance between the center of deflection and the center of the kinescope face, and $\alpha$ is the deflection angle.

The length $h$ of an arc at that radius, in the angle $\alpha$ is $$h=\frac{R}{\cos\alpha}\Delta\alpha \quad (2)$$

The corresponding deflection along the kinescope face is $$\Delta y=\frac{R\Delta\alpha}{\cos^2\alpha} \quad (3)$$

or $$\frac{\Delta\alpha}{\Delta y}=\frac{d\alpha}{dy}=\frac{\cos^2\alpha}{R} \quad (4)$$

For linear deflection the increments $\Delta y$ are equal and $$\frac{dy}{dt}=a \quad (5)$$

Where $a$ is a constant.

Therefore $$\frac{d\alpha}{dt}=\frac{a}{R}\cos^2\alpha \quad (6)$$

To obtain $$\frac{d\alpha}{dt}$$

in term of $t$ $$dt=\frac{R}{a}\frac{d\alpha}{\cos^2\alpha} \quad (7)$$

$$t=\frac{R}{a}\int\frac{d\alpha}{\cos^2\alpha} \quad (8)$$

$$=\frac{R}{a}\tan\alpha \quad (9)$$

$$\alpha=\tan-1\frac{at}{R} \quad (10)$$

$$\frac{d\alpha}{dt}=\frac{1}{1+\left(\frac{at}{R}\right)^2}\frac{a}{R} \quad (11)$$

Now, the voltage E across the winding 98, 98 is $$E=L\frac{di}{dt} \quad (12)$$

Where L is the inductance of the winding, and $i$ is the current through the winding.

Since $a$ is proportional to the current $i$ $$E=K_1\frac{d\alpha}{dt} \quad (13)$$

Where $K_1$ is a constant $$=K_1\frac{a}{R}\left(\frac{1}{1+\left(\frac{at}{R}\right)^2}\right) \quad (14)$$

$$\cong K_1\frac{a}{R}\cdot\left(1-\frac{a^2}{R^2}t^2\right) \quad (15)$$

Where $\cong$ denotes equals approximately.

This is the form of the curve shown in Fig. 2(*f*). The equation only applies between pulses, with the origin located halfway between pulses. The curve at Fig. 2(*f*) is a plot of the negative of the above expression.

The derivation of the proper values for the series capacitor 97 and the inductor or deflection system windings 98, 98 is given below:

$$E=L\frac{di}{d\alpha}\cdot\frac{d\alpha}{dt} \quad (16)$$

Now, $$\frac{di}{d\alpha}=\frac{I_0}{2\alpha_0} \quad (17)$$

Where $I_0$ is the peak-to-peak current required to deflect from $-\alpha_0$ to $+\alpha_0$.

and, $$\frac{d\alpha}{dt}=\frac{1}{1+\left(\frac{at}{R}\right)^2}\frac{a}{R} \quad (11)$$

but, $$a=\frac{dy}{dt}=\frac{2y_0}{t_0} \quad (18)$$

Where $t_0$ is the time from the end of one pulse to the beginning of the next, $y$ is the distance along the face line 303 from the center of the kinescope face, and $y_0$ is the maximum deflection $$\frac{d\alpha}{dt}=\frac{1}{1+\left(\frac{2y_0t}{t_0R}\right)^2}\frac{2y_0}{t_0R} \quad (19)$$

$$\left.\frac{d\alpha}{dt}\right|_{t=\frac{t_0}{2}}=\frac{1}{1+\left(\frac{y_0}{R}\right)^2}\frac{2y_0}{t_0R} \quad (20)$$

Where the symbol ⌋ denotes the value computed at the point where $$t=\frac{t_0}{2}$$

$$=\frac{1}{1+\tan^2\alpha_0}\cdot\frac{2\tan\alpha_0}{t_0} \qquad (21)$$

$$E\Bigg|_{t=\frac{t_0}{2}} =L\frac{I_0\tan\alpha_0}{\alpha_0 t_0}\cdot\frac{1}{1+\tan^2\alpha_0} \qquad (22)$$

$$\cong L\frac{I_0}{t_0}\frac{\tan\alpha_0}{\alpha_0}(1-\tan^2\alpha_0) \qquad (23)$$

$$\cong L\frac{I_0}{t_0}(1-\tan^2\alpha_0) \qquad (24)$$

The peak voltage across the winding 98, 98 during deflection approximates $$L\frac{I_0}{t_0} \qquad (25)$$

but differs by the small amount $$L\frac{I_0}{t_0}\tan^2\alpha_0 \qquad (26)$$

which represents the peak voltage across the capacitor 99. An approximation to the current in the series circuit comprising the winding 98, 98 and the capacitor 99 is $$i\cong\frac{I_0 t}{t_0} \qquad (27)$$

Where $t=0$ half way between pulses.

Then, the voltage across the capacitor 99

$$E_c=\int_0^t \frac{1}{C}\cdot\frac{I_0}{t_0}\cdot t\,dt \qquad (28)$$

$$=\frac{I_0}{2Ct_0}t^2 \qquad (29)$$

$$E_c\Bigg|_{t=t_0/2} =\frac{I_0 t_0}{8C} \qquad (30)$$

but $$E_c\Bigg|_{t=t_0/2} =L\frac{I_0}{t_0}\tan^2\alpha_0=\frac{I_0 t_0}{8C} \qquad (31)$$

$$C=\frac{I_0 t_0}{8}\times\frac{t_0}{LI_0\tan^2\alpha_0} \qquad (32)$$

$$=\frac{t_0^2}{8L\tan^2\alpha_0} \qquad (33)$$

and $$LC=\frac{1}{8}\frac{t_0^2}{\tan^2\alpha_0} \qquad (34)$$

For most circuits in conventional use the voltage pulse width is confined to 0.05 to 0.15 of the total pulse period, with the mean value of 0.10 perhaps representing the optimum. This means that the time interval between pulses is of the order of 0.9 of the total pulse period. For practical purposes the results of Equation 34 can be expressed as $$LC=\frac{1}{8}\frac{n^2p^2}{\tan^2\alpha_0} \qquad (35)$$

Where $p$ is the total pulse period, and
$n$ is $t_0/p$, a constant for the circuit under consideration.

It may be convenient to express the reactance in terms of frequency, whence $$\frac{L}{C}=\frac{1}{8}\frac{n^2p^2}{f_1^2\tan^2\alpha_0} \qquad (36)$$

Where $f_1$ is the pulse recurrence frequency.

For various reasons, flat faced kinescopes are not always desirable and therefore the circuit arrangement according to the invention may be arranged for use with kinescopes having curved faces where the radius of curvature is greater than the distance between the center of deflection and the center of the kinescope face.

Figure 4:
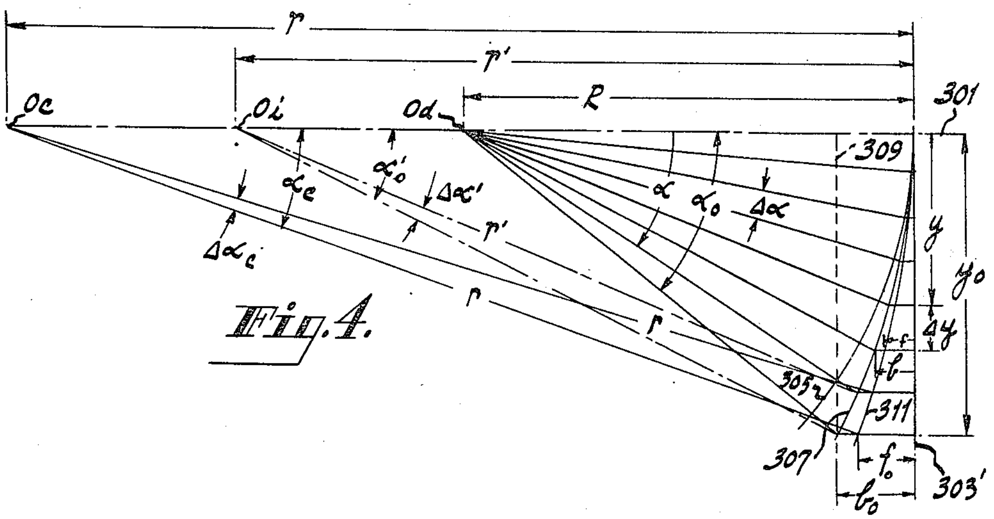

It is recognized that accurate correction for the so called "pin cushion" effect and linearity correction may be made by using a kinescope having a proper radius of tube-face curvature. Such a radius will be determined since it will prove to be helpful as a preliminary to the derivation of actual circuit constants for the circuit arrangement of Fig. 1. Referring now to Fig. 4, if the glass tube face lies on the surface of a sphere containing the curve 305, then equal angular increments, $\Delta\alpha$, would subtend arcs $r\Delta\alpha$ along the spherical surface. This is not desirable, however, as the eye of the viewer is located at such a distance from the face of the kinescope that the lines from the eye to the various points on the screen are substantially parallel for all practical purposes. Therefore the distances $\Delta y$ on a hypothetical plane surface, which corresponds to the face of a flat face kinescope, are distances which must be kept equal to produce the illusion of an undistorted image in the viewer's eye. This requires that the screen surface lie on the sphere containing the line 307 which is the locus of the intersections of horizontal lines dividing the normal face line 303' into equal increments and the radial lines from the center of deflection O which are separated by equal angular increments.

The direction of the deflection taken in either of the figures has no significance: the figures being arranged for convenient correlation of axis and centers: and it is understood that these figures apply equally well to horizontal and vertical deflection of the cathode ray beam. The line 303' is in a hypothetical plane along which the distances are $y=R\alpha$. The horizontal distance from the line 303' to the face of the kinescope, as represented by the curve 307, is $$b=R-\frac{R\alpha}{\tan\alpha}=R\left(1-\frac{\alpha}{\tan\alpha}\right) \qquad (37)$$

$$\tan\alpha=\alpha+\frac{\alpha^3}{3}+\frac{2}{15}\alpha^5 \qquad (38)$$

$$\cong\alpha+\frac{\alpha^3}{3} \qquad (39)$$

$$\frac{\alpha}{\tan\alpha}\cong\frac{\alpha}{\alpha+\alpha\frac{3}{3}}\cong\frac{1}{1+\alpha\frac{2}{3}}\cong1-\frac{\alpha^2}{3} \qquad (40)$$

Then $$b=\frac{R\alpha^2}{3} \qquad (41)$$

However, $$b=r'(-\cos\alpha') \qquad (42)$$

$$=r'\left(1-\left(1-\frac{\alpha^2}{L^2}+\frac{\alpha^4}{L^4}\right)\cdots\right) \qquad (43)$$

$$\cong r'\left(\frac{\alpha'}{2}\right)^2 \qquad (44)$$

Let $d$=the ratio $$\frac{r'}{R} \qquad (45)$$

then $$d=\frac{\alpha_0}{\alpha'}$$

And $$b\cong\frac{rd}{2}\frac{\alpha^2}{d^2}=\frac{r\alpha^2}{2d}$$

but $$b=\frac{r\alpha^2}{3} \qquad (46)$$

so that $r'=3/2\ R$

It is standard practice to build kinescopes with a radius of curvature $r$ somewhat greater than the above value $r'$. Then $$f\cong r\cdot\frac{\alpha c^2}{2}\cong\frac{r'\alpha'^2}{2r/r'} \qquad (47)$$

Where $r$ is the radius of curvature of the kinescope face; and $f$ is the horizontal distance from the hypothetical plane to the inner surface of the kinescope face, but $$\frac{f}{b}=\frac{r'}{r} \qquad (48)$$

The linearity correction required is approximately that required for a flat plate times the quantity $$\frac{b-f}{b}=1-\frac{f}{b}=1-\frac{r'}{r}=\frac{r-r'}{r} \qquad (49)$$

The value of the series capacitor 99 is inversely proportional to the degree of correction required. The value of the capacitor for a flat face kinescope is given by Equation 33.

Then for a kinescope of a given radius of curvature $r$ the value of the series capacitor is $$C=\frac{t_0^2}{8L\tan^2\alpha_0}\times\frac{r}{r-r'} \qquad (50)$$

$$=\frac{1}{8}\frac{t_0^2}{L\tan^2\alpha_0}\cdot\frac{r}{r-\frac{3R}{2}} \qquad (51)$$

The reactance may also be expressed for convenience as $$LC=\frac{1}{8}\frac{n^2p^2}{\tan^2\alpha_0}\cdot\frac{r}{r-\frac{3R}{2}} \qquad (52)$$

$$=\frac{1}{8}\frac{n^2}{f_1^2\tan^2\alpha_0}\cdot\frac{r}{r-\frac{3R}{2}} \qquad (53)$$

$$=\frac{1}{8}\frac{n^2}{f_1^2\tan^2\alpha_0}\cdot\frac{2r}{2r-3R} \qquad (54)$$

$$=\frac{1}{4}\frac{Kr}{f_1^2\tan^2\alpha_0(2r-3R)} \qquad (55)$$

Where K is equal to $n^2$ and if $r=2R$, $$=\frac{K}{f_1^2\tan^2\alpha_0} \qquad (56)$$

The above calculations are based on letting $$\frac{\tan\alpha_0}{\alpha_0}=1 \text{ and } \frac{1}{1+\tan^2\alpha_0}=1-\tan^2\alpha_0$$

which provides results within the commercial tolerances of the components used. A more accurate calculation follows.

As previously stated, in Equation 22;

$$E\Big|_{t=\frac{t_0}{2}}=\frac{d\alpha}{dt}\Big|_{t=\frac{t_0}{2}}=LI_0\frac{\tan\alpha_0}{\alpha_0 t_0}\cdot\frac{1}{1+\tan^2\alpha_0}$$

where $\alpha_0$ is expressed in radians but, $$\tan\alpha_0=\frac{\sin\alpha_0}{\cos\alpha_0} \text{ and } \frac{1}{1+\tan^2\alpha_0}=\cos^2\alpha_0 \qquad (57)$$

Then, $$E\Big|_{t=\frac{t_0}{2}}=L\frac{I_0}{\alpha_0 t_0}\cdot\frac{\sin\alpha_0}{\cos\alpha_0}\cdot\cos^2\alpha_0 \qquad (58)$$

$$=\frac{LI_0}{\alpha_0 t_0}\sin\alpha_0\cdot\cos\alpha_0 \qquad (59)$$

Now, $$\frac{1}{\alpha_0}\sin\alpha_0\cdot\cos\alpha_0=\frac{1}{2\alpha_0}\sin 2\alpha_0 \qquad (60)$$

$$=\frac{1}{2\alpha_0}\left(2\alpha_0-\frac{(2\alpha_0)^3}{3\cdot2}+\frac{(2\alpha_0)^4}{4\cdot3\cdot2}\cdots\right) \qquad (61)$$

$$=\left(1-\frac{2}{3}\alpha_0^2+\frac{\alpha_0^3}{3}\cdots\right) \qquad (62)$$

Whereby, $$E\Big|_{t=\frac{t_0}{2}}=\frac{LI_0}{t_0}\left(1-\frac{2}{3}\alpha_0^2+\frac{\alpha_0^3}{3}\ldots\right) \qquad (63)$$

Neglecting the $$\frac{\alpha_0^3}{3}$$

term and higher order terms, and substituting in Equation 26; the peak voltage across the capacitor 99

$$E_{cp}=\frac{LI_0}{t_0}\cdot\frac{2}{3}\cdot\alpha_0^2 \qquad (64)$$

But the voltage across the capacitor 99, $$E_c\Big|_{t=\frac{t_0}{2}}=L\frac{I_0}{t_0}\frac{2}{3}\alpha_0^2 \qquad (65)$$

Therefore, $$C=\frac{I_0t_0}{8}\times\frac{t_0}{LI_0\frac{2}{3}\alpha_0^2} \qquad (66)$$

$$=\frac{t_0^2}{16_3L\alpha_0} \qquad (67)$$

and, $$LC=\frac{3t_0^2}{16\alpha_0^2} \qquad (68)$$

or $$=\frac{3n^2p^2}{16\alpha_0^2} \qquad (69)$$

In terms of frequency $$LC=\frac{3n^2}{16f_1^2\alpha_0^2} \qquad (70)$$

for flat-face kinescopes, and for kinescopes of radius of curvature $r$, $$=\frac{3t_0^2}{16\alpha_0^2}\times\frac{r}{r-r'} \qquad (71)$$

which in view of Equation 46 becomes $$=\frac{3t_0^2}{16\alpha_0^2}\cdot\frac{r}{r-\frac{3r}{2}} \qquad (72)$$

The values of components listed below, which performed satisfactorily in an application of the invention to a color television receiver are suggested as examples of circuit components for an initial investigation of practical applications of the invention.

| Ref. No. | Component | Type or Value |
|---|---|---|
| 35 | Level adjustor | 10 ko. |
| 38 | Grid resistor | 24 ko. |
| 40 | Amplifier tube | ½ 6AN8. |
| 44 | Cathode resistor | 180 ohms. |
| 46 | Bypass capacitor | 20 mf. |
| 50 | Coupling capacitor | 0.1 mf. |
| 52 | Amplifier tube | ½ 6AN8. |
| 54 | Input resistor | 10 ko. |
| 60 | Cathode resistor | 1,000 ohms. |
| 62 | Bypass capacitor | 20 mf. |
| 64 | Anode resistor | 4 ko. |
| 70 | Variable resistor | 25 ko. |
| 74 | Shunt fixed resistor | 10 ko. |
| 76 | Deflection wave amplifier | 6F6. |
| 79 | Cathode resistor | 270 ohms. |
| 81 | Bypass capacitor | 20 mf. |
| 83 | Screen bypass | 0.1 mf. |
| 86 | Choke element | 100 mh. |
| 89 | Feedback resistor | 490 ko. |
| 90 | Phasing capacitor | 0.5–1.75 mf. |
| 91 | Variable capacitor | 5,600 mmf. |
| 92 | 2nd resonating element | 2.1 mh., 14,000 mmf. |
| 93 | 3rd resonating element | 1.0 mh., 11,000 mmf. |
| 94 | 4th resonating element | 0.74 mh., 8,200 mmf. |
| 95 | 5th resonating element | 0.41 mh., 7,200 mmf. |
| 96 | 6th resonating element | 0.93 mh., 6,400 mmf. |
| 97 | 7th resonating element | 0.83 mh., 4,300 mmf. |
| 98 | Deflection winding | 11.7 mh. total. |
| 99 | Series capacitor: | |
| | (for flat face) | 0.128 mf. |
| | (for $r/R=2$) | 0.512 mf. |
| $t_0$ | time interval | $55\times10^{-6}$ sec. |
| $p$ | pulse period | $63.5\times10^{-6}$ sec. |
| $\alpha_0$ | peak deflection angle | ±30°. |

Obviously other values and potentials will be suggested by those skilled in the art for other applications of the invention.

The invention claimed is:

1. In a cathode ray tube deflection system, a deflection wave translating device having an output circuit at which a train of potential pulses is presented, a deflection winding and a capacitive reactance element connected in series across said output circuit, the product of the inductance of said deflection winding in henries and the capacitance of said capacitive reactance element in farads being directly proportional to the quotient of the square of the time interval between said potential pulses and the square of the tangent of the maximum deflection angle.

2. In a cathode ray tube deflection system, a deflection wave translating device having an output circuit at which a substantially linear sawtooth current wave is presented, a deflection winding coupled to said output circuit and a capacitive reactance element interposed in series circuit relationship with said deflection winding, said capacitive reactance element having a capacitance in farads inversely proportional the product of the inductance in henries of the deflection winding, the square of the frequency of said sawtooth wave and the square of the tangent of the maximum deflection angle.

3. In a cathode ray tube deflection system, a deflection wave translating device having an output circuit at which a train of potential pulses is presented, a deflection winding and a capacitive reactance element connected in series across said output circuit, the product of the inductance of said deflection winding in henries and the capacitance of said capacitive reactance element in farads being directly proportional to one-eight of the quotient of the square of the time interval between said potential pulses and the square of the tangent of the maximum deflection angle, all multiplied by a factor equal to the ratio of the radius of curvature of the face of said cathode ray tube to the difference between that radius and the radius of a sphere defined by the intersection of rays of equiangular increment and lines of equidistant deflection in a direction normal to the axis at the center of the face of said cathode ray tube.

4. In a cathode ray tube deflection system, a deflection wave translating device having an output circuit at which a substantially linear sawtooth current wave is presented, a deflection winding coupled to said output circuit and a capacitor interposed in series circuit relationship with said deflection winding, said capacitor having a capacitance in farads equal to one-eighth of the quotient of the square of the time period between voltage pulses of the voltage wave corresponding to said sawtooth current wave and the product of the inductance in henries of the deflection winding and the square of the tangent of the maximum deflection angle, all multiplied by a factor equal to the ratio of twice the radius of curvature of the face of said cathode ray tube to the difference between twice that radius and twice the radius of deflection.

5. In a deflection system for a flat face cathode ray tube, a deflection wave translating device having an output circuit at which a train of potential pulses with substantially flat baseline is presented, a deflection winding and a capacitor connected in series across said output circuit, the product of the inductance of the winding in henries and the capacitance of the series capacitor in farads being equal to one-eighth of the quotient of the square of the time interval between said potential pulses and the square of the tangent of the maximum deflection angle.

6. In a deflection system for a cathode ray tube, having a radius of curvature twice the radius of deflection, a deflection wave translating device having an output circuit at which a substantially linear sawtooth current wave is presented, a deflection winding coupled to said output circuit and a capacitor interposed in series circuit relationship with said deflection winding, said capacitor having a capacitance in farads equal to the quotient of a constant and the product of the square of the frequency of said sawtooth current wave, the inductance in henries of the deflection winding and the square of the tangent of the maximum deflection angle.

7. In a television receiver having a kinescope, a deflection system including, a deflection winding arranged in cooperative relationship to said kinescope and a capacitor connected in series circuit relationship with said deflection winding, means responsive to a train of synchronizing pulses to apply a substantially linear sawtooth current wave to said series circuit, the product of the inductance of said winding in henries and the capacitance of said capacitor in farads, $$LC=\frac{t_0^2}{8\tan^2\alpha_0}\,\frac{r}{r-r'}$$

where $t_0$ is the time interval in seconds between synchronizing pulses, $\alpha_0$ is the maximum deflection angle, $r$ is the radius of curvature of the kinescope under consideration and $r'$ is the radius of curvature of a sphere defined by the intersection of equal angular increments with equal distance increments in a plane normal to the axis of the kinescope at the center of the face of the kinescope.

8. In a television receiver having a kinescope, a deflection system including, a deflection winding arranged in cooperative relationship to said kinescope and a capacitor connected in series circuit relationship with said deflection winding, means responsive to a train of synchronizing pulses to apply a substantially linear sawtooth current wave to said series circuit, the product of the inductance of said winding in henries and the capacitance of said capacitor in farads, $$LC\;\frac{t_0^2}{8\tan^2\alpha}\,\frac{2r}{2r-3R}$$

where $t_0$ is the time interval in seconds between synchronizing pulses, $\alpha$ is the maximum deflection angle, $r$ is the radius of curvature of the kinescope under consideration and R is the radius of deflection of the kinescope under consideration.

9. In a television receiver having a kinescope with a face of radius of curvature twice the radius of deflection, a deflection system including, a deflection winding arranged in cooperative relationship to said kinescope and a capacitor connected in series circuit relationship with said deflection winding, means responsive to a train of synchronizing pulses to apply a substantially linear sawtooth current wave to said series circuit, the product of the inductance of said winding in henries and the capacitance of said capacitor in farads being equal to $$\frac{K}{f_1^2 \tan^2 \alpha_0}$$

where K is a constant relating to the synchronizing pulses, $f_1$ is the frequency of the sawtooth wave, and $\alpha_0$ is the maximum deflection angle.

10. In a television receiver having a substantially flat faced kinescope, a deflection system including, a deflection winding arranged in cooperative relationship to said kinescope and a capacitor connected in series circuit relationship with said deflection winding, means responsive to a train of synchronizing pulses to apply a substantially linear sawtooth current wave to said series circuit, the product of the inductance of said winding in henries and the capacitance of said capacitor in farads being equal to $$LC = \frac{t_0^2}{8 \tan^2 \alpha_0}$$

where $t_0$ is the time interval in seconds between synchronizing pulses and $\alpha_0$ is the maximum deflection angle.

11. In a television receiver, a deflection system including a synchronizing pulse amplifying chain comprising a plurality of stages with an input circuit and an output circuit for the chain, means connecting the output circuit to the input circuit, a number of parallel circuits and a variable capacitor all connected in series across said output circuit, and a deflection winding and a series capacitor connected across said output circuit, said parallel circuits being adjusted to tune the overall circuit comprising the deflection winding, the series capacitor, the variable capacitor and the parallel circuits to successive harmonics of the deflection frequency, and the variable capacitor is adjusted to tune said overall circuit to resonance at said frequency, the product of the inductance of said deflection winding in henries and the capacitance of said series capacitor in farads directly proportional to the quotient of the square of the time interval between said synchronizing pulses and the square of the tangent of the maximum deflection angle.

12. In a television receiver, a deflection system including a synchronizing pulse amplifying chain comprising a plurality of stages with an input circuit and an output circuit for the chain, means connecting the output circuit to the input circuit, a number of parallel circuits and a variable capacitor all connected in series across said output circuit, and a deflection winding and a series capacitor connected across said output circuit, said parallel circuits being adjusted to tune the overall circuit comprising the deflection winding, the series capacitor, the variable capacitor and the parallel circuits to successive harmonics of the deflection frequency, and the variable capacitor is adjusted to tune said overall circuit to resonance at said frequency, the product of the inductance of said deflection winding in henries and the capacitance of said series capacitor in farads equal to one-eighth of the quotient of the square of the time interval between said synchronizing pulses and the square of the tangent of the maximum deflection angle, all multiplied by a factor equal to the quotient of the radius of curvature of the face of the kinescope and the difference between that radius and the radius of a sphere defined by the intersection of points of uniform angular deflection and uniform linear deflection of the kinescope on a plane normal to the center of the face of said kinescope.

13. In a television receiver, a horizontal deflection system including a synchronizing pulse amplifying chain comprising an odd number of stages with an input circuit and an output circuit for the chain, means connecting the output circuit to the input circuit for alternating current flow only, a number of parallel circuits and a variable capacitor all connected in series across said output circuit, and a deflection winding and a series capacitor connected across said output circuit, said parallel circuits being adjusted to tune the overall circuit comprising the deflection winding, the series capacitor, the variable capacitor and the parallel circuits to successive harmonics of the horizontal deflection line frequency, and the variable capacitor is adjusted to tune said overall circuit to resonance at said line frequency, the product of the inductance of said deflection winding in henries and the capacitance of said series capacitor being equal to one-eighth of the quotient of the square of the time interval between said synchronizing pulses and the square of the tangent of the maximum deflection angle, all multiplied by a factor equal to the quotient and the radius of curvature of the kinescope and the difference between that radius and the radius of a sphere defined by the intersection of points of uniform angular deflection and uniform linear deflection of the kinescope on a plane normal to the center of the face of said kinescope.

14. In a television receiver, a horizontal deflection system including a synchronizing pulse amplifying chain comprising a plurality of stages with an input circuit and an output circuit for the chain, means connecting the output circuit to the input circuit for alternating current flow only, a number of parallel circuits and a variable capacitor all connected in series across said output circuit, and a deflection winding and a series capacitor connected across said output circuit, said parallel circuits being adjusted to tune the overall circuit comprising the deflection winding, the series capacitor, the variable capacitor and the parallel circuits to successive harmonics of the horizontal deflection line frequency, and the variable capacitor is adjusted to tune said overall circuit to resonance at said line frequency, the product of the inductance of said deflection winding in henries and the capacitance of said series capacitor being equal to one-eighth of the quotient of the square of a fraction of the synchronizing pulse period and the square of the tangent of the maximum deflection angle, all multiplied by a factor equal to the quotient of the radius of curvature of the kinescope and the difference between that radius and the radius of deflection of the kinescope.

15. In a cathode ray tube deflection system a deflection wave translating device having an output circuit at which a train of potential pulses is presented, a deflection winding and a capacitive reactance element connected in series across said output circuit, the product of the inductance of said deflection winding in henries and the capacitance of said capacitive reactance element in farads being directly proportional to the quotient of the square of the time interval between said potential pulses and the square of the maximum deflection angle in radians.

16. In a cathode ray tube deflection system, a deflection wave translating device having an output circuit at which a substantially linear sawtooth current wave is presented, a deflection winding coupled to said output circuit and a capacitive reactance element interposed in series circuit relationship with said deflection winding, said capacitive reactance element having a capacitance in farads inversely proportional the product of the inductance in henries of the deflection winding, the square of the frequency of said sawtooth wave and the square of the maximum deflection angle in radians.

17. In a cathode ray tube deflection system, a deflection wave translating device having an output circuit at which a train of potential pulses is presented, a deflection winding and a capacitive reactance element connected in series across said output circuit, the product of the inductance of said deflection winding in henries and the capacitance of said capacitive reactance element in farads being directly proportional to one eighth of the quotient of the square of the time interval between said potential pulses and the square of the maximum deflection angle in radians, all multiplied by a factor equal to the ratio of the radius of curvature of the face of said cathode ray tube to the difference between that radius and the radius of a sphere defined by the intersection of rays of equiangular increment and lines of equidistant deflection in a direction normal to the axis at the center of the face of said cathode ray tube.

18. In a cathode ray tube deflection system, a deflection wave translating device having an output circuit at which a substantially linear sawtooth current wave is presented, a deflection winding coupled to said output circuit and a capacitor interposed in series circuit relationship with said deflection winding, said capacitor having a capacitance in farads equal to three-sixteenths of the quotient of the square of the time period between voltage pulses of the voltage wave corresponding to said sawtooth current wave and the product of the inductance in henries of the deflection winding and the square of the maximum deflection angle in radians, all multiplied by a factor equal to the ratio of twice the radius of curvature of the face of said cathode ray tube to the difference between twice that radius and twice the radius of deflection.

19. In a television receiver having a kinescope, a deflection system including, a deflection winding arranged in cooperative relationship to said kinescope and a capacitor connected in series circuit relationship with said deflection winding, means responsive to a train of synchronizing pulses to apply a substantially linear sawtooth current wave to said series circuit, the product of the inductance of said winding in henries and the capacitance of said capacitor in farads, $$LC=\frac{3t_0^2}{16\alpha_0^2}\,\frac{r}{r-r'}$$

where $t_0$ is the time interval in seconds between synchronizing pulses, $\alpha_0$ is the maximum deflection angle in radians, $r$ is the radius of curvature of the kinescope under consideration and $r'$ is the radius of curvature of a sphere defined by the intersection of equal angular increments with equal distance increments in a plane normal to the axis of the kinescope at the center of the face of the kinescope.

20. In a television receiver having a kinescope, a deflection system including, a deflection winding arranged in cooperative relationship to said kinescope and a capacitor connected in series circuit relationship with said deflection winding, means responsive to a train of synchronizing pulses to apply a substantially linear sawtooth current wave to said series circuit, the product of the inductance of said winding in henries and the capacitance of said capacitor in farads, $$LC=\frac{3t_0^2}{16\alpha_0^2}\,\frac{2r}{2r-3R}$$

where $t_0$ is the time interval in seconds between synchronizing pulses, $\alpha$ is the maximum deflection angle in radians, $r$ is the radius of curvature of the kinescope under consideration and R is the radius of deflection of the kinescope under consideration.

References Cited in the file of this patent

UNITED STATES PATENTS

| | | |
|---|---|---|
| 2,074,496 | Vance | Mar. 23, 1937 |
| 2,179,607 | Bedford | Nov. 14, 1939 |
| 2,608,672 | Miller | Aug. 26, 1952 |

FOREIGN PATENTS

| | | |
|---|---|---|
| 577,216 | Great Britain | May 9, 1946 |